US012563302B2

(12) United States Patent (10) Patent No.: US 12,563,302 B2
Chang et al. (45) Date of Patent: Feb. 24, 2026

(54) MOTION AND LIGHTING BASED EXPOSURE CONTROL FOR IMAGE CAPTURE

(71) Applicant: QUALCOMM Incorporated, San Diego, CA (US)

(72) Inventors: Wei-Te Chang, Taipei (TW); Yi-Han Liao, Taipei (TW); Wei-Chih Liu, Taipei (TW); Wen-Chun Feng, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 18/524,861

(22) Filed: Nov. 30, 2023

(65) Prior Publication Data

US 2025/0184612 A1    Jun. 5, 2025

(51) Int. Cl.
*H04N 23/73* (2023.01)
*H04N 23/71* (2023.01)
(Continued)

(52) U.S. Cl.
CPC ............. *H04N 23/73* (2023.01); *H04N 23/71* (2023.01); *H04N 23/741* (2023.01); *H04N 23/80* (2023.01)

(58) Field of Classification Search
CPC ...... H04N 23/73; H04N 23/71; H04N 23/741; H04N 23/80; H04N 25/589; H04N 23/743; H04N 23/6811; H04N 25/583; H04N 23/70; H04N 23/45; H04N 23/667; H04N 23/72; H04N 25/134; H04N 5/265; H04N 23/60; H04N 23/683; H04N 23/6812; H04N 23/951; H04N 23/81; H04N 23/76; G06T 5/50; G06T 2207/20208; G06T 2207/10144; G06T 2207/20221;
(Continued)

(56) References Cited

U.S. PATENT DOCUMENTS 9,584,733 B2 * 2/2017 Doepke .................. H04N 23/00
2008/0253758 A1 * 10/2008 Yap ........................ H04N 23/71
396/234

(Continued)

FOREIGN PATENT DOCUMENTS

CN       116055890 A      5/2023

OTHER PUBLICATIONS

International Search Report and Written Opinion—PCT/US2024/056520—ISA/EPO—Feb. 10, 2025.

*Primary Examiner* — Abdelaaziz Tissire
(74) *Attorney, Agent, or Firm* — QUALCOMM Incorporated

(57) ABSTRACT

This disclosure provides systems, methods, and devices for image signal processing that support controlling image capture based on movement and/or lighting conditions. In a first aspect, a method of image processing includes determining lighting and movement conditions for an image scene and determining exposure settings for an image sensor based on these conditions. An exposure overlap setting may also be determined based on the movement and lighting conditions and the exposure settings. The image sensor may then capture one or more initial image frames guided by these parameters. Finally, an output image frame may be determined from these initial frames, such as with a blending process. Other aspects and features are also claimed and described.

27 Claims, 6 Drawing Sheets

(51) Int. Cl.
    *H04N 23/741*      (2023.01)
    *H04N 23/80*       (2023.01)

(58) Field of Classification Search
    CPC ... G06T 2207/10016; G06T 5/92; G06T 5/90;
                                G06T 2207/10024
    See application file for complete search history.

(56)                References Cited

U.S. PATENT DOCUMENTS

| 2010/0165135 | A1* | 7/2010 | Kalevo | H04N 23/741 |
| | | | | 348/222.1 |
| 2010/0328482 | A1* | 12/2010 | Chang | G06T 5/50 |
| | | | | 348/222.1 |
| 2012/0262600 | A1* | 10/2012 | Velarde | H04N 23/73 |
| | | | | 348/223.1 |
| 2015/0312463 | A1* | 10/2015 | Gupta | G06T 7/20 |
| | | | | 348/239 |
| 2017/0201665 | A1* | 7/2017 | Yokoya | G03B 7/093 |
| 2018/0227479 | A1* | 8/2018 | Parameswaran | H04N 23/63 |
| 2022/0224820 | A1* | 7/2022 | Liu | H04N 25/134 |

* cited by examiner

300

Image Sensor 304

Computing Device 302

Image Frame(s) 306

Image Frame(s) 308

Lighting Conditions 312

Movement Conditions 314

Exposure Overlap Settings 316

Exposure Settings 318

Blending Process 320

Output Image Frame(s) 310

430

432

434

436

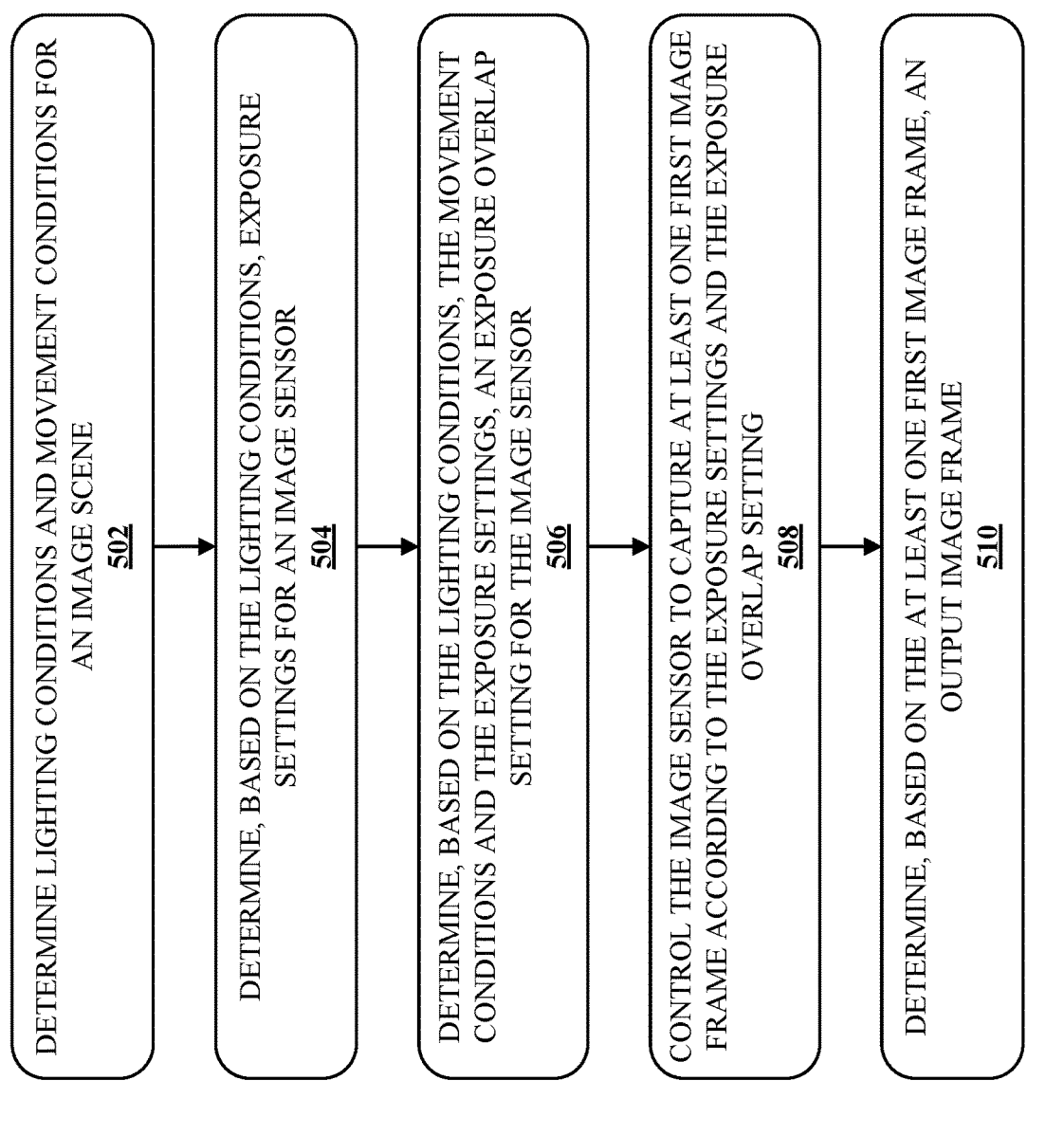

DETERMINE LIGHTING CONDITIONS AND MOVEMENT CONDITIONS FOR AN IMAGE SCENE
502

DETERMINE, BASED ON THE LIGHTING CONDITIONS, EXPOSURE SETTINGS FOR AN IMAGE SENSOR
504

DETERMINE, BASED ON THE LIGHTING CONDITIONS, THE MOVEMENT CONDITIONS AND THE EXPOSURE SETTINGS, AN EXPOSURE OVERLAP SETTING FOR THE IMAGE SENSOR
506

CONTROL THE IMAGE SENSOR TO CAPTURE AT LEAST ONE FIRST IMAGE FRAME ACCORDING TO THE EXPOSURE SETTINGS AND THE EXPOSURE OVERLAP SETTING
508

DETERMINE, BASED ON THE AT LEAST ONE FIRST IMAGE FRAME, AN OUTPUT IMAGE FRAME
510

MOTION AND LIGHTING BASED EXPOSURE CONTROL FOR IMAGE CAPTURE

TECHNICAL FIELD

Aspects of the present disclosure relate generally to image processing, and more particularly, to configuring image capture. Some features may enable and provide improved image processing, including configuring image capture based on lighting conditions and movement conditions.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person to be significantly blurred. Lower aperture lenses produce higher blurring than higher aperture lenses. However, lower aperture lenses generally are larger in size and made from higher-cost materials.

Dynamic range may be important to image quality when capturing a representation of a scene with a wide color gamut using an image capture device. Conventional image sensors have a limited dynamic range, which may be smaller than the dynamic range of human eyes. Dynamic range may refer to the light range between bright portions of an image and dark portions of an image. A conventional image sensor may increase an exposure time to improve detail in dark portions of an image at the expense of saturating bright portions of an image. Alternatively, a conventional image sensor may decrease an exposure time to improve detail in bright portions of an image at the expense of losing detail in dark portions of the image. Thus, image capture devices conventionally balance conflicting desires, preserving detail in bright portions or dark portions of an image, by adjusting exposure time. High dynamic range (HDR) photography improves photography using these conventional image sensors by combining multiple recorded representations of a scene from the image sensor.

Human eyes perceive colors in a different manner than electronic image sensors. One configuration records separate red, green, and blue color values representing a scene. The appearance of a scene, and particularly the color of objects in the scene, is dependent on the illumination source. Different illumination sources have different light colors, which can be observed by comparing an incandescent bulb that outputs yellow-tinted white light to a light-emitting diode (LED) that outputs blue-tinted white light. Human eyes adapt to different light sources, whereas electronic image sensors generally capture light information identically in different scenes. As a result, the recorded colors from an electronic image sensor may not match the human-perceived color of the scene, such as when human eyes compensate for the yellow tinting to make white objects appear white even when lit by incandescent bulbs while the electronic image sensor records white objects as yellow when lit by incandescent bulbs. A white balancing algorithm may be applied to the output of the electronic image sensor to compensate for different lighting sources to improve the match between the electronic representation of the scene and the human-perceived appearance of the scene.

Movement of subjects while capturing image frames (i.e., image frames for composition into a single still image, image frames for use as part of a video sequence) can create various distortions within the image frames. For example, movement of one or more objects within an image frame may cause the objects to blur and/or blend together or may leave motion artifacts within the captured image frame.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect provides a method that includes determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

Another aspect provides an apparatus that includes a memory storing processor-readable code, and at least one processor coupled to the memory. The at least one processor may be configured to execute the processor-readable code to cause the at least one processor to perform operations. The operations may include: determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

A further aspect includes a non-transitory computer-readable medium storing instructions that, when executed by a processor, cause the processor to perform operations. The operations may include determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

An addition aspect provides an image capture device that includes an image sensor; a memory storing processor-readable code; and at least one processor coupled to the memory and to the image sensor. The at least one processor may be configured to execute the processor-readable code to cause the at least one processor to: determine lighting conditions and movement conditions for an image scene; determine, based on the lighting conditions, exposure settings for an image sensor; determine, based on the lighting conditions and the movement conditions and the exposure settings, an exposure overlap setting for the image sensor; control the image sensor to capture at least one first image frame according to the exposure settings and the exposure overlap setting; and determine, based on the at least one first image frame, an output image frame.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multiframe noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 shows a flow chart of an example method for processing image data to control image capture based on movement conditions and lighting conditions according to some embodiments of the disclosure.

Like reference numbers and designations in the various drawings indicate like elements.

DETAILED DESCRIPTION

Figure 1:
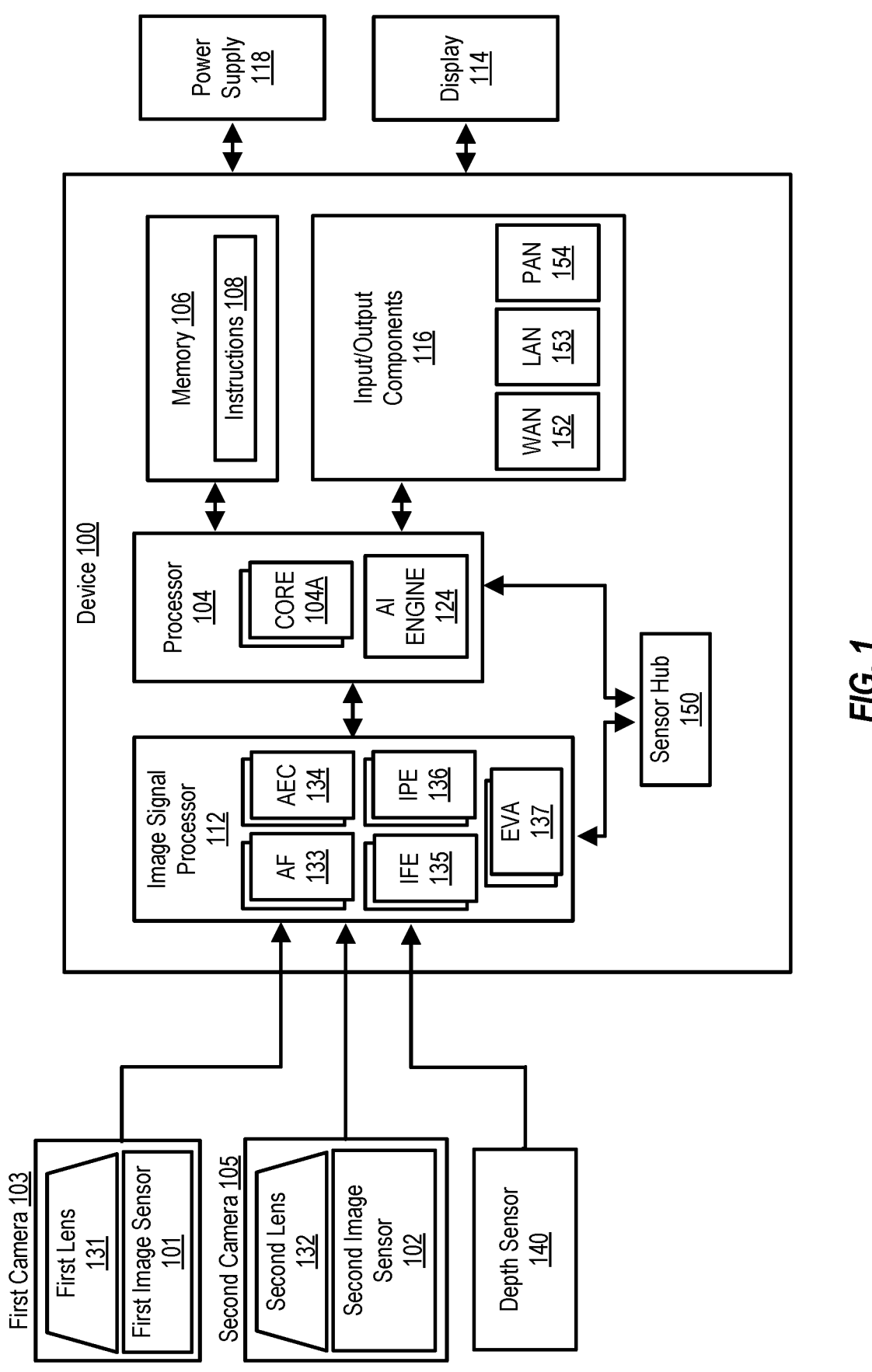
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Existing techniques for determining image frames that accurately reflect high dynamic ranges in imaging scenes use multi-frame blending of image frames with different exposure values (EV). However, such techniques may encounter issues, such as visual artifacts, when dealing with moving objects in the scene. For example, movement during an exposure can create stretching or other artifacts. As another example, movement between image frames may create ghosting artifacts. All such artifacts distort and therefore reduce image quality of captured image frames. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

The present disclosure provides systems, apparatus, methods, and computer-readable media that support image processing, including techniques for controlling image capture based on movement and lighting conditions. In particular, one solution to the problem noted above is to determine lighting conditions and movement conditions for an image scene and adjusting exposure settings for an image sensor based on these conditions. Additionally, an exposure overlap setting for the image sensor may be determined from these parameters to control image artifacts. In particular, based on lighting conditions such as dynamic range measurements and brightness measurements from previously captured frames, exposure settings including exposure durations can be determined for subsequent image frames that may then be used in determining HDR image frames. These settings may include multiple varied durations if lighting conditions indicate a high enough dynamic range. Further refinements based on movement characteristics can be made to ensure that motion artifacts are prevented or minimized. For instance, determining that movement exists within certain portions of an image scene may lead to adjustments in exposure overlap settings so that certain exposures at least partially overlap with another set of exposures. The overlapping exposure may be determined based on lighting conditions in regions with movement. Such adjustments ensure stability in capturing fast-moving subjects without introducing motion-related distortions.

Particular implementations of the subject matter described in this disclosure may be implemented to realize one or more of the following potential advantages or benefits. In particular, the present techniques offer several benefits over existing image capture systems, primarily by reducing artifacts in areas with movement for blending, ensuring that the output images retain as much of the original scene's quality as possible. Due to the responsive nature of these techniques to actual movement and lighting conditions, corrections are not overly applied, keeping images natural-looking and high quality. By further adjusting the operating mode of image sensors, such as between binning or remosaic operating modes based on lighting conditions, image quality may be further improved. These adjustments can be made dynamically in response to changing scene conditions, thereby optimizing image capture performance for given scenarios.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including exposure control operations. For example, execution of the instructions can instruct the image signal processor 112 to begin or end capturing an image frame or a sequence of image frames, in which the capture accounts for current lighting conditions and/or movement conditions as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by coordinating exposure settings and overlap according to lighting conditions and movement conditions with image scenes. One example method of operating one or more cameras, such as camera 103, is shown in FIG. 2 and described below.

Figure 2:
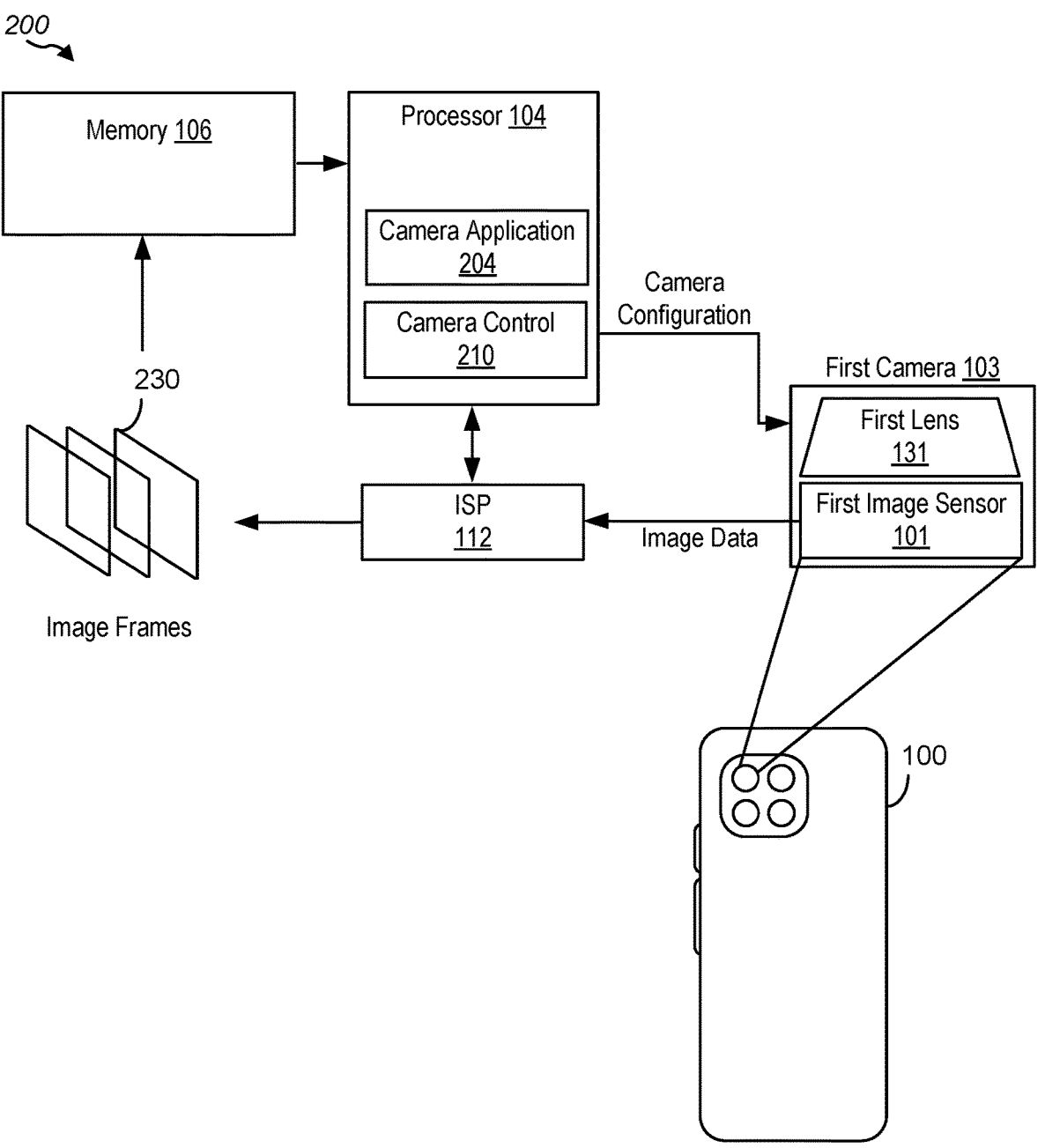
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0.

The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 3:
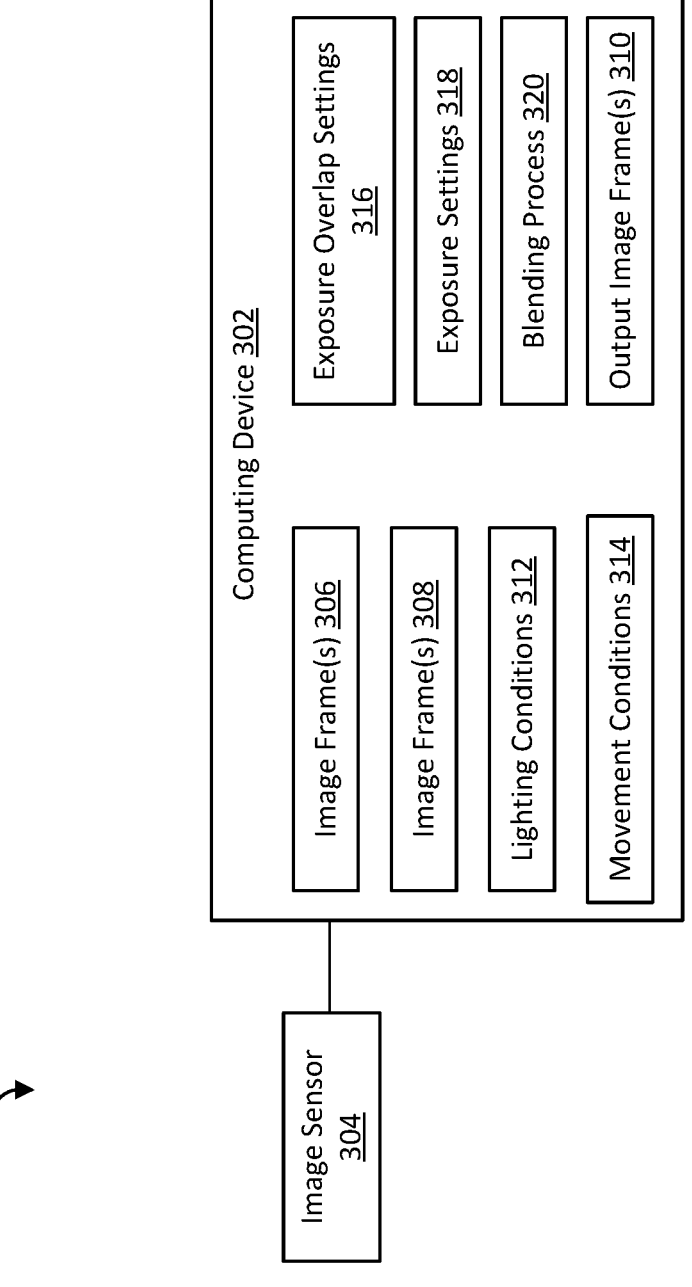
FIG. 3 depicts a system for controlling image capture based on movement conditions and lighting conditions according to some embodiments of the disclosure.

For example, FIG. 3 depicts a system 300 for configuring image capture based on lighting conditions and movement conditions according to some embodiments of the disclosure. The system 300 includes an image sensor 304 and a computing device 302. The computing device 302 includes image frames 306, 308, lighting conditions 312, movement conditions 314, exposure settings 318, exposure overlap settings 316, a blending process 320, and an output image frame 310.

The computing device 302 may be configured to determine lighting conditions 312 and movement conditions 314 for an image scene. In certain implementations, the image scene may include a physical area or environment that is currently in frame, in view of, or otherwise able to be captured in one or more image frames by the image sensor 304. In certain implementations, the image scene may include all of the visible range within a field of view (FOV) of the image sensor 304. In additional or alternative implementations, the image scene may include a subset of the field of view of the image sensor 304. For example, a user may be zoomed in on a subset of the field of view (such as using a digital zoom feature of a camera application) when capturing a photo. In such instances, the zoomed in portion of the field of view may constitute the image scene, such as the portion of the FOV displayed via a camera application.

In certain implementations, the lighting conditions 312 and the movement conditions 314 are determined based on at least one second image frame 308 captured of the image scene by the image sensor 304. In certain implementations, the at least one second image frame 308 may include consecutive image frames of the scene. For example, the consecutive image frames may have been consecutively captured by the image sensor 304. Consecutively captured images may include images that have been captured in sequential order (such as one after the other). Additionally or alternatively, consecutively captured images may include images that are captured at least partially at the same time (such as using one or more overlapping exposure times). In certain implementations, the consecutive image frames may include the two most recently captured image frames in a sequence of image frames captured by the image sensor 304. For example, the image frames may be captured for display via a camera application (such as for use as preview frames within the camera application). As another example, the image frames may be captured as part of a sequence of image frames in a video being captured by the image sensor 304 and/or the computing device 302. In certain implementations, the at least one second image frame 308 may be captured prior to receiving a request from a user to capture an image of the image scene. For example, the at least one second image frame 308 may be a preview image frame displayed to the user, as described above. In additional or alternative implementation, at least a subset of the at least one second image frame 308 may be captured after receiving the request from the user to capture an image of the image scene. For example, the at least one second image frame 308 may include one or more image frames specifically captured for use in determining the movement conditions (such as one or more image frames with a predetermined frame spacing, one or more image frames with different exposure settings to measure dynamic range, and the like).

In implementations where the at least one second image frame 308 includes consecutive image frames, the movement conditions 314 may be determined based on a comparison between the consecutive image frames. In certain implementations, the movement conditions 314 identify variations between corresponding portions of the consecutive image frames. For example, the computing device 302 may compare corresponding portions of the consecutive image frames and may identify movement where an object is depicted in different locations within the consecutive image frames. In certain implementations, movement may be determined as the difference between the positions (such as a difference in pixels). In certain implementations, corresponding portions of the consecutive image frames may include corresponding pixels (such as pixels located at the same position within the consecutive image frames), particular combinations of pixels (such as 2×2, 3×3, 4×4 squares of pixels and the like, image masks of various shapes, or combinations thereof), particular objects detected within the image frames (such as individuals, animals, vehicles, signs, trees, and the like), or combinations thereof. Movement conditions 314 may be stored as metadata for one or more of the consecutive image frames. For example, the movement conditions 314 may be stored as embedded metadata for one or more of the consecutive image frames. Additionally or alternatively, the metadata may be stored as a mask for one or more of the consecutive image frames, which may be stored separately or together with the consecutive image frames. The movement conditions 314 (when stored as metadata or otherwise) may indicate movement, including one or more of a degree of movement, a direction of movement, an object that is moving, or combinations thereof. In particular implementations, the movement conditions 314 may indicate a movement speed (such as in pixels per second, distance per second, pixels per frame, distance per frame, or combinations thereof). Additionally or alternatively, movement conditions 314 may indicate a degree of movement, such as fast movement, medium movement, or slow movement, which may be identified based on corresponding thresholds for the different degrees of movement. In still further implementations, the movement conditions 314 may indicate directions of movement (leftward movement, rightward movement).

Figure 4A:
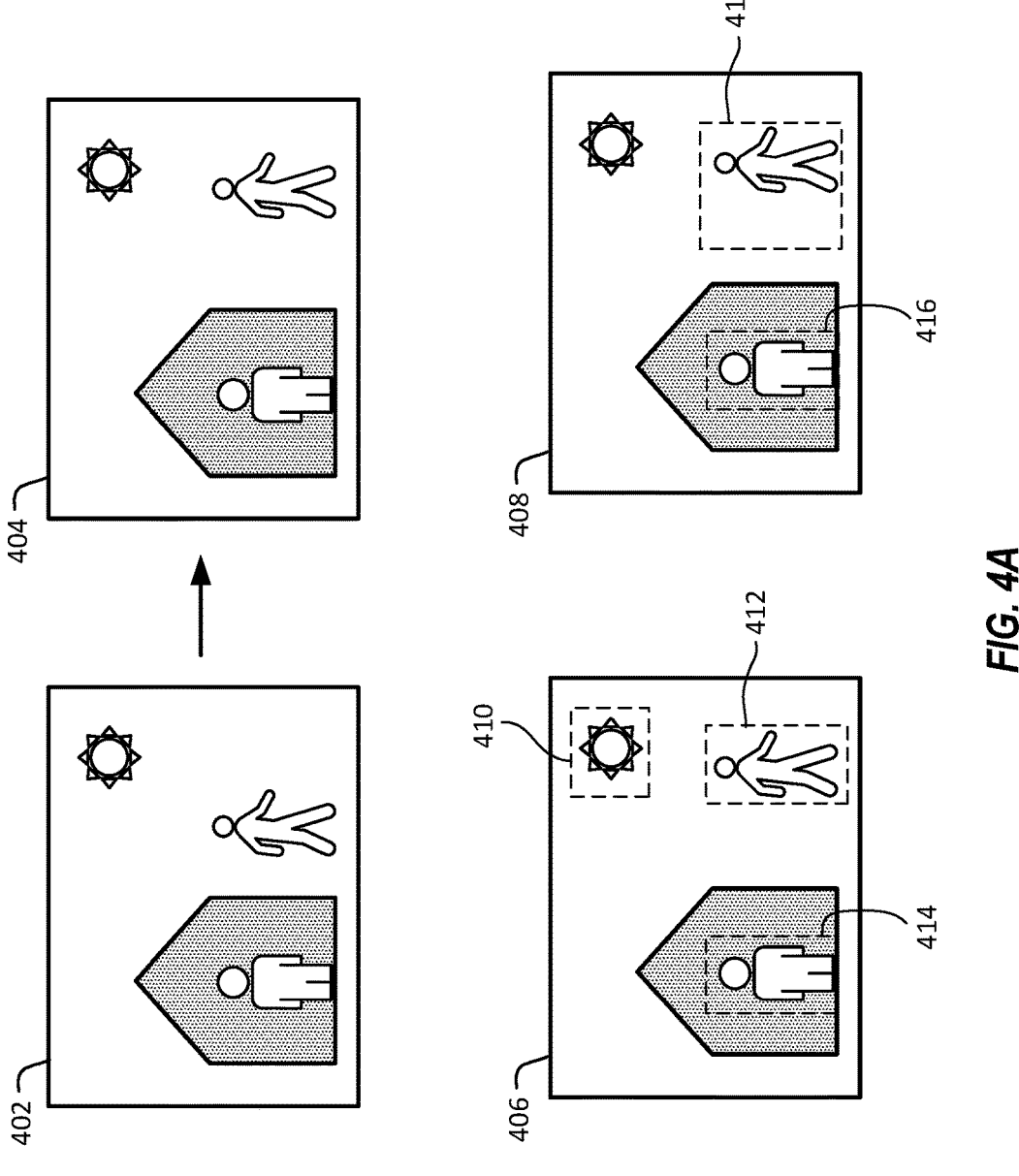
FIG. 4A depicts an imaging scenario according to one aspect of the present disclosure.

For example, FIG. 4A depicts an imaging scenario 400 according to an exemplary embodiment of the present disclosure. The imaging scenario 400 includes consecutive image frames 402, 404, in which the image frame 402 is captured before the image frame 404. As can be seen in the image frames 402, 404, one person is standing inside a building in a dimly lit area and another person is standing outside of the building in a brightly lit area. Additionally, the person standing in the brightly lit area moves in between capture of the image frames 402, 404. The consecutive images 402, 404 may be used to determine movement conditions 408 for the image scene captured in image frames 402, 404. The movement conditions 408 may identify different types of movements within different portions of the image scene. As depicted, the movement conditions 408 are depicted as indications presented in combination with the image frame 404. This depiction is selected for clarity purposes, and other implementations may be used to store or present the movement conditions 408. In particular, the movement conditions 408 identify portion 416 of the image scene that has no movement between the consecutive image frames 402, 404 and another portion 418 that has movement (such as fast movement) between the consecutive image frames 402, 404. As shown, the portion 418 includes the positions of the person in both of the image frames 402, 404. This may be done to fully capture the range of locations within the image scene in which movement was detected. In additional or alternative implementations, the portion 418 may only identify a small region (such as a region corresponding specifically to the current location of the user).

Returning to FIG. 3, the lighting conditions 312 may be determined based on dynamic range measurements of the at least one second image frame 308. In certain implementations, the lighting conditions 312 include dynamic range measures for different portions of the at least one second image frame 308. Different portions of the at least one second image frame 308 may include individual pixels of the at least one second image frame 308, particular combinations of pixels (such as 2×2, 3×3, 4×4 squares of pixels and the like, image masks of various shapes, or combinations thereof), particular objects detected within the image frames (such as individuals, animals, vehicles, signs, trees, and the like), or combinations thereof.

The dynamic range measures may be determined as a ratio of other comparison the brightest intensity to the darkest intensity within the at least one second image frame 308. In implementations where the at least one second image frame 308 includes more than one image frame, the lighting conditions 312 may be determined based on the most recent image frame from the at least one second image frame 308, based on multiple image frames (such as average values for multiple image frames, maximum or minimum values from multiple image frames, and the like), or combinations thereof. In certain implementations, to determine a dynamic range measure for the image scene as a whole, statistical measures such as mean and standard deviation of pixel intensities may be calculated across frames from the at least one second image frame 308. In particular regions of the image scene, dynamic range measures may be determined using similar techniques for those regions (such as based on pixel values from a region). For specific locations within the frames, localized measurements may be employed. In additional or alternative implementations, other techniques such as adaptive histogram equalization (AHE) may be used to determine the distribution of pixel intensity values within an image scene, and the dynamic range measure may be determined based on this distribution. In certain implementations, the lighting conditions 312 may be stored as metadata for at least one second image frame 308 (such as embedded metadata, separately stored metadata). In certain implementation, the lighting conditions 312 may include an overall dynamic range measure for the image scene (such as for the least one second image frame 308) as a whole. In additional or alternative implementations, the lighting conditions 312 may be stored to indicate dynamic range and/or brightness measures for corresponding locations (such as metadata for the corresponding locations) within the at least one second image frame 308.

Returning to FIG. 4A., the imaging scenario 400 also includes lighting conditions 406 determined based on the image frames 402, 404. In particular, the lighting conditions 406 may be determined based on one or more brightness or dynamic range measures for the image frame 404. As shown, the lighting conditions 406 identify a dimly lit area 414 corresponding to the person within the building, a brightly lit area 412 corresponding to the person that is outside, and an extremely brightly lit area 410 corresponding to the sun. In certain implementations, the areas 410, 412, 414 may be indicated as particular categories. In additional or alternative implementation, these areas 410, 412, 414 may include specific brightness or dynamic range measures.

In FIG. 3, the computing device 302 may be configured to determine, based on the lighting conditions 312, exposure settings 318 for an image sensor 304. The exposure settings 318 may include one or more parameters that control or otherwise configure operation of the image sensor 304. In certain implementations, the exposure settings 318 may include a gain setting for the image sensor 304, such as between 0 to 24 dB. In certain implementations, the exposure settings 318 may include zoom settings allow for a variation in focal lengths, which can be expressed in millimeters (e.g., 18-55 mm) or as a zoom factor (e.g., 1× to 10×). In certain implementations, the exposure settings 318 may include exposure durations, which may be indicated in seconds or fractions thereof (e.g., $\frac{1}{60}$ to 30 seconds). In certain implementations, the exposure settings 318 may include exposure timings, which may identify specific times at which different exposures are taken (such as for one or more image frames 306 used to determine an output image frame 310). In certain implementations, the exposure settings 318 may include aperture settings, which may be denoted by f-numbers (e.g., f/2.8, f/8) to adjust the diameter of the lens opening for the image sensor 304. In additional or alternative implementations, the exposure settings 318 may include one or more of ISO levels, white balance, and focus settings.

In particular implementations, the exposure settings 318 for the image sensor 304 may include exposure durations for the at least one first image frame 306 to be captured by the image sensor 304. In certain implementations, the computing device 302 may be configured to determine a number of first image frames 306 to be captured of the image scene in order to determine an output image frame 310 of the image scene. For example, in scenes with higher dynamic ranges indicated by the lighting conditions 312, the computing device 302 may be configured to determine more than one image frame (with more than one corresponding exposure duration) in order to fully capture the dynamic range of the scene. In certain implementations, exposure settings 318 for particular exposures may be indicated in exposure variation (EV), a unit that quantifies the amount of exposure adjustment made. One EV may correspond to a one-stop change in exposure, either halving or doubling the amount of light hitting the sensor, which in turn affects the brightness of the captured image frame. Exposure settings 318 for particular exposures may also indicate durations for these exposures.

In one example, determining the exposure settings 318 includes determining that the lighting conditions 312 indicate a dynamic range less than a first predetermined threshold and determining the exposure settings 318 to include a first exposure duration. In another example, determining the exposure settings 318 includes determining that the lighting conditions 312 indicate a dynamic range for the image scene that is greater than or equal to the first predetermined threshold and determining the exposure settings 318 to include a first exposure duration and a second exposure duration that is longer than the first exposure duration. In a further example determining the exposure settings 318 includes determining that the lighting conditions 312 indicate a dynamic range for the image scene that is greater than or equal to a second predetermined threshold and determining the exposure settings 318 to include a first exposure duration, a second exposure duration that may be longer than the first exposure duration, and a third exposure duration longer than the first exposure duration and the second exposure duration.

Figure 4B:
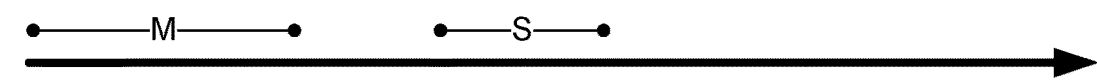
FIG. 4B depicts timing diagrams according to one aspect of the present disclosure.
Figure 4B:
Figure 4B:
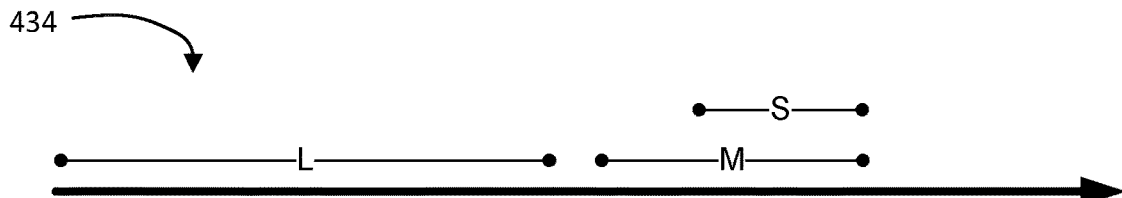
Figure 4B:
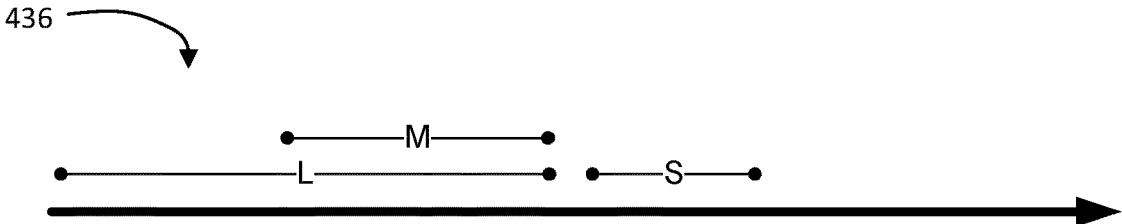

For example, FIG. 4B depicts several exposure timing diagrams 430, 432, 434, 436 according to exemplary aspects of the present disclosure. The timing diagrams 430, 432, 434, 436 include exposure durations for different image frames to be captured by an image sensor, such as the image sensor 304. In particular, the timing diagrams 430, 432, 434, 436 include one or more of a short exposure duration, a medium exposure duration, and a long exposure duration. The short exposure duration may be an exemplary implementation of the first exposure duration discussed above, the medium exposure duration may be an exemplary implementation of the second exposure duration discussed above, the long exposure duration may be an exemplary implementation of the third exposure duration discussed above, or combinations thereof. In certain implementations, the short exposure duration may range from $\frac{1}{4000}$ to $\frac{1}{500}$ of a second, the medium exposure duration may range from $\frac{1}{500}$ to $\frac{1}{30}$ of a second, and the long exposure duration may range from $\frac{1}{30}$ of a second to 1 second). As one skilled in the art will appreciate, in certain implementations, the specific durations for the short exposure duration, the medium exposure duration, the long exposure duration, or combinations thereof may differ for different timing diagrams 430, 432, 434, 436 and/or for different imaging conditions (such as for image scenes with different dynamic ranges). As one specific example, the short exposure duration in the timing diagrams 434 may be shorter than the short exposure duration in the timing diagrams 430. As another example, the long exposure duration in the timing diagrams 432 may be longer than the long exposure duration in the timing diagrams 436.

Turning now to the timing diagrams 430, two exposure durations are included for two separate image frames to be captured by an image sensor. In particular, the timing diagrams 430 includes a medium exposure duration followed by a short exposure duration, and there is a blanking interval between the two exposures during which an image frame is not captured. The timing diagrams 432 includes three exposure durations for three separate image frames to be captured by the image sensor: a long exposure duration followed by a medium exposure duration, followed by a short exposure duration. There are blanking intervals between the long and medium exposures and between the medium and short exposures. The blanking intervals may be shorter than the blanking interval in the timing diagrams 430. In both of the timing diagrams 430, 432, each image frame, and each corresponding exposure, are captured individually. Stated differently, in the timing diagrams 430, 432, only a single image frame is captured at a time.

However, such a configuration may not be required. Overlapping one or more of the exposures may improve the capture of image frames in which one or more objects in an image scene are moving. In particular, by overlapping exposures for certain image frames, dynamic range of the resulting output images may be improved without creating ghosting or other visual artifacts in regions where the objects are moving. The timing diagram 434 depicts one such instance in which exposure durations overlap. In particular, the timing diagram 434 includes a long exposure, similar to the long exposure in the timing diagram 432. However, timing diagram 434 includes both a medium and short exposure, which overlap. In particular, the short exposure overlaps with the end of the medium exposure. Other implementations are possible, such as different times for overlap between the short medium exposure. Turning to the timing diagram 436, the long exposure duration and the medium exposure duration overlap instead. Based on these disclosures, one skilled in the art will appreciate that different implementations and/or configurations of exposure durations may cause different portions of different exposure times to overlap. Which exposures are selected to overlap with one another may be selected based on the movement conditions and/or the lighting conditions within the image scene.

In particular, and returning to FIG. 3, the computing device 302 may be configured to determine, based on the lighting conditions 312, the movement conditions 314, and the exposure settings 318, an exposure overlap setting 316 for the image sensor 304. In particular, the computing device 302 may be configured to determine the exposure overlap setting 316 in response to determining that two or more image frames should be captured of the image scene. In certain implementations, the exposure overlap settings 316 may include an amount of overlap between two or more of the image frames to be captured according to the exposure settings 318. The amount of overlap may be specified as a duration of overlap (such as in milliseconds), a percentage of overlap for one or both of the image frames 306, or combinations thereof. In still further implementations, the exposure overlap setting 316 may be indicated as specific exposure timings for each of the image frames to be captured. For example, the exposure overlap setting 316 may indicate start and stop times for particular image frames to be captured according to the exposure settings 318, and the start and stop times may be determined such that two or more of the image frames at least partially overlap. As one skilled in the art will appreciate, overlapping exposure times may include a time or specific duration (such as 5 ms or more, 1 ms or more, 0.5 ms or more, 0.1 ms or more, and the like) during which sensor data received by the image sensor 304 may be used for determining at least two image frames.

In certain implementations, the exposure overlap setting 316 may be determined based on lighting conditions 312 in regions of the scene for which the movement conditions 314 indicate movement greater than a predetermined threshold. For example, determining the exposure overlap settings 316 may further include determining that the movement conditions 314 indicate movement in at least one portion of the image scene for which the lighting conditions 312 are greater than or equal to a predetermined threshold and determining the exposure overlap setting 316 such that a short exposure indicated by the exposure setting 318 overlaps at least partially with another exposure indicated by the exposure settings 318 (such as the medium exposure, as in the timing diagram 434). For instance, in the scenario 400, the movement conditions 408 indicate movement in an area 418 that corresponds to an area 412 within the lighting conditions 406 that is brightly lit (such as that exceeds a predetermined brightness threshold). Accordingly, the computing device 302 may determine that a short exposure time should overlap with another exposure time when capturing an image of this image scene. In particular, during the HDR blending process 320, details for this region from image frames with short and medium exposure durations are likely to be given a greater weight than from image frames with long exposure durations. Accordingly, overlap in the short and medium exposure frames in this way is likely to reduce movement between these two frames, thereby reducing overall visual artifacts in this region from the blending process.

As another example, determining the exposure overlap settings 316 may include determining that the movement conditions 314 indicate movement in at least one portion of the image scene for which the lighting conditions 312 are less than a predetermined threshold and determining the exposure overlap setting 316 such that a long exposure indicated by the exposure settings 318 overlaps at least partially with another exposure indicated by the exposure settings 318 (such as the medium exposure, as in the timing diagram 436). For instance, in a different version of the scenario 400, if the person in the building were moving, a corresponding region in movement conditions for that scenario would indicate movement in a region that corresponds to a region within lighting conditions for that scenario that is dimly lit (such as that does not meet or exceed a predetermined brightness threshold). Accordingly, the computing device 302 may determine that a long exposure time should overlap with another exposure time when capturing an image of this image scene. In particular, during the HDR blending process 320, details for this region from image frames with long and medium exposure durations are likely to be given a greater weight than from image frames with short exposure durations. Accordingly, overlap in the long and medium exposure frames in this way is likely to reduce movement between these two frames, thereby reducing overall visual artifacts in this region from the blending process 320.

In implementations where there is movement both in at least one region with lighting conditions 312 that are greater than or equal to the predetermined threshold and at least one region with lighting conditions 312 that are less than the predetermined threshold, the computing device 302 may determine the exposure overlap settings 316 such that both the short exposure frame and the long exposure frame overlap with at least another image frame. For example, a long exposure duration, a medium exposure duration, and a short exposure duration may all overlap with one another.

The predetermined threshold may be expressed as a brightness value for a corresponding portion of the image frame (such as measured in lux or similar units). In certain implementations, the predetermined threshold may be determined based on a dynamic range of the image scene indicated by the lighting conditions 312. For example, scenes with higher dynamic ranges may have higher corresponding thresholds. In additional or alternative implementations, the predetermined threshold may be determined at least in part based on a brightness measure of the image scene, such as the brightness measure discussed in greater detail below. For example, the predetermined threshold may be determined as a particular percentage of the maximum brightness detected in the image scene. Dynamically adjusting the predetermined threshold may improve the responsiveness of overlap determination, ensuring that frames are overlapped when needed to improve image quality by reducing artifacts.

The computing device 302 may be configured to control the image sensor 304 to capture at least one first image frame 306 according to the exposure settings 318 and the exposure overlap setting 316. In certain implementations, controlling the image sensor 304 to capture the one or more first image frame 306 may include providing the exposure settings 318 to the image sensor 304 with an instruction to capture one or more image frames according to the exposure settings 318 (such as according to the exposure durations indicated in the exposure settings 318, the exposure timings indicated in the exposure settings 318, or combinations thereof). In additional or alternative implementations, the computing device 302 may be configured to directly control the operation of the image captured device in order to capture image frames according to the exposure settings 318 and the exposure overlap settings 316. In various implementations, the image sensor 304 may be controlled using the processor 104, such as via the camera control 210).

The computing device 302 may be configured to determine, based on the at least one first image frame 306, an output image frame 310. In certain implementations, the output image frame 310 may be determined by blending the one or more image frames according to a blending process 320. In certain implementations, the blending process 320 may be an HDR blending process. HDR blending processes may blend multiple image frames captured with varying exposure settings and durations to determine a single output image with a high dynamic range, such as using tone mapping or other processes. In certain implementations, the output image frame 310 may be captured and stored as an individual image. In additional or alternative implementations, the output image frame 310 may be captured as part of a sequence of image frames (such as for use in a video, camera preview, or combinations thereof).

In implementations where the output image frame 310 is used as part of a sequence of image frames, the exposure settings 318 may be determined based on one or more constraints for the sequence of image frames. For example, the computing device 302 may be configured to capture video at 30 fps (such as according to one or more user-configurable settings) and/or to display camera preview frames at 30 fps. In such instances, a maximum exposure time for the exposure settings 318 may be determined based on the frame rate (such as a maximum of 33.3 ms for 30 fps). In certain implementations, the exposure overlap settings 316 may be determined based on constraints for the sequence of image frames. For example, an image sensor may be capable of capturing images at a faster frame rate than the current video capture rate (such as 60 fps in the above example). In such instances, the exposure overlap settings 316 may be determined such that two image frames are captured (such as a first image frame with a 16.5 ms exposure time and a second image frame with a 33.3 ms exposure time) and subsequently used to determine a final output image for the 30 fps sequence of image frames.

In certain implementations, the lighting conditions 312 further include a brightness measure of the image scene. In such instances, the method further comprises determining an anchor frame of the blending process 320 based on the brightness measure and the movement conditions 314. For example, where the exposure overlap settings 316 indicate overlap for exposures of one or more of the first image frames 306, the anchor frame may be selected to include one of the overlapping image frames. As a specific example, for the timing diagrams 434, 436, the image frame with the medium exposure duration may be selected as the anchor frame for the blending process 320.

In certain implementations, the brightness measure may be determined based on the dynamic range of the image scene. For example, the lighting conditions 312 may indicate brightness values for different regions of the second image frame 308, and the brightness measure may be determined as a maximum value of these brightness values. In further implementations, the brightness measure may be determined separately from the dynamic range. For example, the brightness measure may be determined based on a maximum brightness of the image scene, such as a maximum lux measure from the at least one second image frame 308 captured of the image scene, which may be determined separately from the image measurements used to determine the dynamic range. In certain implementations, the computing device 302 may be configured to receive the one or more image frames captured by the image sensor 304 and to determine the output image frame 310. In additional or alternative implementations, the output image frame 310 may be determined by the image sensor 304 based on the one or more image frames, and the computing device 302 may receive the output image frame 310 from the image sensor 304. For example, the image sensor may include an ISP similar to the ISP 112, which may be configured to determine the output image frame 310 before providing the output image frame 310 to the computing device 302. In certain implementations, whether the computing device 302 receives the one or more image frames and/or the output image frame 310 from the image sensor 304 may be configurable, such as according to one or more manufacturer-configurable settings, user-configurable settings, or combinations thereof.

In implementations where the lighting conditions 312 further include a brightness measure of the image scene, the computing device 302 may be further configured to determine an operating mode for the image sensor 304 based on the lighting conditions 312. The selected operating mode may then be used to capture the one or more image frames 306. In certain implementations, the selected operating mode may be included within the exposure settings 318. In additional or alternative implementations, the selected operating mode may be separately stored and/or provided to the image sensor 304 when controlling the image sensor 304 to capture the one or more image frames. In certain implementations, determining the operating mode comprises selecting between a binning operating mode and a remosaic operating mode for the at least one image sensor 304.

As one skilled in the art will appreciate, a binning mode may involve the combination of adjacent pixel data prior to readout and further processing, which may reduce the spatial resolution while enhancing the signal-to-noise ratio (SNR) for the resulting image signal. For instance, in a 2×2 binning scenario, four adjacent pixels may be grouped and their charges combined, thereby outputting a single pixel value. Binning operating modes may be particularly beneficial in low-light conditions or when a higher frame rate may be desired, as the reduction in resolution may lead to faster readout times and lower data bandwidth requirements. On the other hand, remosaic operating modes may entail the utilization of color filter arrays (CFAs) to interpolate missing color information for each pixel based on the neighboring pixel values. For instance, a Bayer filter pattern may be used, where each pixel may be sensitive to red, green, or blue light, and the missing color values are interpolated from the neighboring pixels. Remosaic operating modes may be beneficial in scenarios where higher spatial resolution and color accuracy are desirable, and where scenes are well lit.

In certain implementations, determining the operating mode based on the lighting conditions 312 further includes determining that the brightness measure is less than a predetermined threshold and determining the binning operating mode for the image sensor 304. In certain implementations, determining the operating mode based on the lighting conditions 312 further includes determining that the brightness measure satisfies a predetermined threshold (such as is greater than or equal to the predetermined threshold) and determining the remosaic operating mode for the image sensor 304. In certain implementations, such selection techniques may enable improved performance and image quality for imaging scenes that are less bright using the increased sensitivity of the binning operating mode for the image capture device while also allowing for the improved clarity and sharpness offered by the remosaic operating mode of the image capture device for image scenes that are more brightly lit.

The systems 200, of FIGS. 2, 3 may be configured to perform the operations described with reference to FIGS. 3, 4A, 4B to determine output image frames 230. FIG. 5 shows a flow chart of an example method for processing image data to configure image capture settings based on lighting conditions and movement conditions according to some embodiments of the disclosure. The capturing in FIG. 3 may obtain an improved digital representation of a scene, which results in a photograph or video with higher image quality (IQ). The method 500 may be implemented on a computer system, such as the systems 100, 200, 300. For example, the method 500 may be implemented by the device 100 and/or the computing device 302. The method 500 may also be implemented by a set of instructions stored on a computer readable medium that, when executed by a processor, cause the computing device to perform the method 500. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks may be optional.

The method 500 includes determining lighting conditions and movement conditions for an image scene (block 502). For example, the computing device 302 may determine lighting conditions 312 and movement conditions 314 for an image scene. In certain implementations, the lighting conditions 312 and the movement conditions 314 are determined based on at least one second image frame 308 captured of the image scene by the image sensor 304. In certain implementations, the at least one second image frame 308 may include consecutive image frames of the scene. In such instances, the movement conditions 314 may be determined based on a comparison between the consecutive image frames. In certain implementations, the movement conditions 314 identify variations between corresponding portions of the consecutive image frames. In certain implementations, the lighting conditions 312 are determined based on dynamic range measurements of the at least one second image frame 308. In certain implementations, the lighting conditions 312 include dynamic range measures for different portions of the at least one second image frame 308.

The method 500 includes determining, based on the lighting conditions, exposure settings for an image sensor (block 504). For example, the computing device 302 may determine, based on the lighting conditions 312, exposure settings 318 for an image sensor 304. In certain implementations, the exposure settings 318 for the image sensor 304 include exposure durations for the at least one first image frame 306 to be captured by the image sensor 304. In certain implementations, determining the exposure settings 318 further includes determining that the lighting conditions 312 indicate a dynamic range less than a first predetermined threshold and determining the exposure settings 318 to include a first exposure duration. In certain implementations, determining the exposure settings 318 further includes determining that the lighting conditions 312 indicate a dynamic range for the image scene that may be greater than equal to a first predetermined threshold and determining the exposure settings 318 to include a first exposure duration and a second exposure duration that may be longer than the first exposure duration. In certain implementations, determining the exposure settings 318 further includes determining the lighting conditions 312 indicate a dynamic range for the image scene that may be greater than or equal to a second predetermined threshold and determining the exposure settings 318 to include a first exposure duration, a second exposure duration that may be longer than the first exposure duration, and a third exposure duration longer than the first exposure duration and the second exposure duration.

The method 500 includes determining, based on the lighting conditions, the movement conditions, and the exposure settings, an exposure overlap setting for the image sensor (block 506). For example, the computing device 302 may determine, based on the lighting conditions 312, the movement conditions 314 and the exposure settings 318, an exposure overlap setting 316 for the image sensor 304. In particular, the computing device 302 may be configured to determine the exposure overlap setting 316 in response to determining that two or more image frames should be captured of the image scene. In certain implementations, the exposure overlap settings 316 may include an amount of overlap between two or more of the first image frames 306 to be captured according to the exposure settings 318. In certain implementations, the exposure overlap setting 316 may be determined based on lighting conditions 312 in regions of the scene for which the movement conditions 314 indicate movement greater than a predetermined threshold. In certain implementations, determining the exposure overlaps setting includes determining that the movement conditions 314 indicate movement in at least one portion of the image scene for which the lighting conditions 312 are less than a predetermined threshold and determining the exposure overlap setting 316 such that a long exposure indicated by the exposure settings 318 overlaps at least partially with another exposure indicated by the exposure settings 318. In certain implementations, determining the exposure overlap settings 316 further includes determining that the movement conditions 314 indicate movement in at least one portion of the image scene for which the lighting conditions 312 are greater than or equal to a predetermined threshold and determining the exposure overlap setting 316 such that a short exposure indicated by the exposure setting overlap at least partially with another exposure indicated by the exposure settings 318. In certain implementations, the predetermined threshold may be determined based on a dynamic range of the image scene indicated by the lighting conditions 312. In additional or alternative implementations, the predetermined threshold may be determined at least in part based on a brightness measure of the image scene.

The method 500 includes controlling the image sensor to capture at least one first image frame according to the exposure settings and the exposure overlap setting (block 508). For example, the computing device 302 may control the image sensor 304 to capture at least one first image frame 306 according to the exposure settings 318 and the exposure overlap setting 316. In certain implementations, controlling the image sensor 304 to capture the one or more image frames may include providing the exposure settings 318 to the image sensor 304 with an instruction to capture one or more image frames according to the exposure settings 318. In additional or alternative implementations, the computing device 302 may be configured to directly control the operation of the image sensor in order to capture image frames according to the exposure settings 318 and the exposure overlap settings 316.

The method 500 includes determining, based on the at least one first image frame, an output image frame (block 510). For example, the computing device 302 may determine, based on the at least one first image frame 306, an output image frame 310. In certain implementations, the output image frame 310 may be determined by blending the one or more image frames according to a blending process 320, such as an HDR blending process 320.

In certain implementations, the lighting conditions 312 further include a brightness measure of the image scene. In such instances, the method 500 may further include determining an anchor frame of the blending process 320 based on the brightness measure and the movement conditions 314. In additional or alternative implementations, the method 500 may further include determining an operating mode for at least one image sensor 304 of the image sensor 304 based on the lighting conditions 312. For example, the operating mode may be selected between a binning operating mode and a remosaic operating mode.

In one or more aspects, techniques for supporting image processing may include additional aspects, such as any single aspect or any combination of aspects described below or in connection with one or more other processes or devices described elsewhere herein. A first aspect provides a method that includes determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

In a second aspect, in combination with the first aspect, the lighting conditions and the movement conditions are determined based on at least one second image frame captured of the image scene by the image sensor.

In a third aspect, in combination with the second aspect, the at least one second image frame includes consecutive image frames of the image scene. The movement conditions are determined based on variations between corresponding portions of the consecutive image frames.

In a fourth aspect, in combination with one or more of the second aspect through the third aspect, the lighting conditions are determined based on dynamic range measurements of the at least one second image frame.

In a fifth aspect, in combination with one or more of the first aspect through the fourth aspect, the exposure settings for the image sensor include exposure durations for the at least one first image frame captured by the image sensor.

In a sixth aspect, in combination with one or more of the first aspect through the fifth aspect, determining the exposure settings further includes determining that the lighting conditions indicate a dynamic range for the image scene that is greater than or equal to a first predetermined threshold; and determining the exposure settings to include a first exposure duration and a second exposure duration that is longer than the first exposure duration.

In a seventh aspect, in combination with one or more of the first aspect through the sixth aspect, determining the exposure settings further includes determining that the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

In an eighth aspect, in combination with one or more of the first aspect through the seventh aspect, determining the exposure overlap setting further includes determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

In a ninth aspect, in combination with one or more of the first aspect through the eighth aspect, determining the exposure overlap settings further includes determining that the movement conditions indicate movement in at least one portion of the image scene for which the lighting conditions are greater than or equal to a predetermined threshold; and determining the exposure overlap setting such that a short exposure indicated by the exposure setting overlap at least partially with another exposure indicated by the exposure settings.

In a tenth aspect, in combination with one or more of the first aspect through the ninth aspect, the output image frame is determined by blending the at least one first image frame according to a blending process. The lighting conditions may further include a brightness measure of the image scene, and the method may further include determining an anchor frame of the blending process based on the brightness measure and the movement conditions.

In an eleventh aspect, in combination with one or more of the first aspect through the tenth aspect, the lighting conditions further include a brightness measure of the image scene. The method may further include determining an operating mode for at least one image sensor of the image sensor based on the lighting conditions. The operating mode is selected from the group consisting of a binning operating mode and a remosaic operating mode.

A twelfth aspect provides an apparatus that includes a memory storing processor-readable code, and at least one processor coupled to the memory. The at least one processor may be configured to execute the processor-readable code to cause the at least one processor to perform operations. The operations may include: determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirteenth aspect, in combination with the twelfth aspect, the exposure settings for the image sensor include exposure durations for the at least one first image frame captured by the image sensor.

In a fourteenth aspect, in combination with one or more of the twelfth aspect through the thirteenth aspect, determining the exposure settings further includes determining that the lighting conditions indicate a dynamic range for the image scene that is greater than or equal to a first predetermined threshold; and determining the exposure settings to include a first exposure duration and a second exposure duration that is longer than the first exposure duration.

In a fifteenth aspect, in combination with one or more of the twelfth aspect through the fourteenth aspect, determining the exposure settings further includes determining that the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

In a sixteenth aspect, in combination with one or more of the twelfth aspect through the fifteenth aspect, determining the exposure overlaps setting further includes determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

In a seventeenth aspect, in combination with one or more of the twelfth aspect through the sixteenth aspect, determining the exposure overlaps settings further includes determining that the movement conditions indicate movement in at least one portion of the image scene for which the lighting conditions are greater than or equal to a predetermined threshold; and determining the exposure overlap setting such that a short exposure indicated by the exposure setting overlap at least partially with another exposure indicated by the exposure settings.

In an eighteenth aspect, in combination with one or more of the twelfth aspect through the seventeenth aspect, the output image frame is determined by blending the at least one first image frame according to a blending process. The lighting conditions further include a brightness measure of the image scene. The operations further may include determining an anchor frame of the blending process based on the brightness measure and the movement conditions.

In a nineteenth aspect, in combination with one or more of the twelfth aspect through the eighteenth aspect, the lighting conditions further include a brightness measure of the image scene. The operations further may include determining an operating mode for at least one image sensor of the image sensor based on the lighting condition. The operating mode is selected from the group consisting of a binning operating mode and a remosaic operating mode.

A twentieth aspect includes a non-transitory computer-readable medium storing instructions that, when executed by a processor, cause the processor to perform operations. The operations may include determining lighting conditions and movement conditions for an image scene; determining, based on the lighting conditions, exposure settings for an image sensor; determining, based on the lighting conditions and the movement conditions and the exposure settings, an exposure overlap setting for the image sensor; controlling the image sensor to capture at least one first image frame according to the exposure settings and the exposure overlap setting; and determining, based on the at least one first image frame, an output image frame.

In a twenty-first aspect, in combination with the twentieth aspect, determining the exposure settings further includes determining that the lighting conditions indicate a dynamic range for the image scene that is greater than or equal to a first predetermined threshold; and determining the exposure settings to include a first exposure duration and a second exposure duration that is longer than the first exposure duration.

In a twenty-second aspect, in combination with one or more of the twentieth aspect through the twenty-first aspect, determining the exposure settings further includes determining the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

In a twenty-third aspect, in combination with one or more of the twentieth aspect through the twenty-second aspect, determining the exposure overlaps setting further includes determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

In a twenty-fourth aspect, in combination with one or more of the twentieth aspect through the twenty-third aspect, determining the exposure overlaps settings further includes determining that the movement conditions indicate movement in at least one portion of the image scene for which the lighting conditions are greater than or equal to a predetermined threshold; and determining the exposure overlap setting such that a short exposure indicated by the exposure setting overlap at least partially with another exposure indicated by the exposure settings.

In a twenty-fifth aspect, in combination with one or more of the twentieth aspect through the twenty-fourth aspect, the output image frame is determined by blending the at least one first image frame according to a blending process. The lighting conditions further include a brightness measure of the image scene. The operations further may include determining an anchor frame of the blending process based on the brightness measure and the movement conditions.

A twenty-sixth aspect provides an image capture device that includes an image sensor; a memory storing processor-readable code; and at least one processor coupled to the memory and to the image sensor. The at least one processor may be configured to execute the processor-readable code to cause the at least one processor to: determine lighting conditions and movement conditions for an image scene; determine, based on the lighting conditions, exposure settings for an image sensor; determine, based on the lighting conditions and the movement conditions and the exposure settings, an exposure overlap setting for the image sensor; control the image sensor to capture at least one first image frame according to the exposure settings and the exposure overlap setting; and determine, based on the at least one first image frame, an output image frame.

In a twenty-seventh aspect, in combination with the twenty-sixth aspect, determining the exposure settings further includes determining that the lighting conditions indicate a dynamic range for the image scene that is greater than or equal to a first predetermined threshold; and determining the exposure settings to include a first exposure duration and a second exposure duration that is longer than the first exposure duration.

In a twenty-eighth aspect, in combination with one or more of the twenty-sixth aspect through the twenty-seventh aspect, determining the exposure settings further includes determining that the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

In a twenty-ninth aspect, in combination with one or more of the twenty-sixth aspect through the twenty-eighth aspect, determining the exposure overlaps setting further includes determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

In a thirtieth aspect, in combination with one or more of the twenty-sixth aspect through the twenty-ninth aspect, determining the exposure overlaps settings further includes determining that the movement conditions indicate movement in at least one portion of the image scene for which the lighting conditions are greater than or equal to a predetermined threshold; and determining the exposure overlap setting such that a short exposure indicated by the exposure setting overlaps at least partially with another exposure indicated by the exposure settings.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIGS. 1-3.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
   determining lighting conditions and movement conditions for an image scene;
   determining, based on the lighting conditions, exposure settings for an image sensor, wherein the lighting conditions further includes a brightness measure of the image scene;
   determining, based on the lighting conditions and the movement conditions and the exposure settings, an exposure overlap setting for the image sensor;
   controlling the image sensor to capture at least one first image frame according to the exposure settings and the exposure overlap setting;
   determining an anchor frame of a blending process based on the brightness measure and the movement conditions; and
   determining, based on the at least one first image frame, an output image frame, wherein the output image frame is determined by blending the at least one image frame according to the blending process.

2. The method of claim 1, wherein the lighting conditions and the movement conditions are determined based on at least one second image frame captured of the image scene by the image sensor.

3. The method of claim 2, wherein the at least one second image frame includes consecutive image frames of the image scene, and wherein the movement conditions are determined based on variations between corresponding portions of the consecutive image frames.

4. The method of claim 2, wherein the lighting conditions are determined based on dynamic range measurements of the at least one second image frame.

5. The method of claim 1, wherein the exposure settings for the image sensor include exposure durations for the at least one first image frame captured by the image sensor.

6. The method of claim 1, wherein determining the exposure settings further comprises:
   determining that the lighting conditions indicate a dynamic range for the image scene that is greater than or equal to a first predetermined threshold; and
   determining the exposure settings to include a first exposure duration and a second exposure duration that is longer than the first exposure duration.

7. The method of claim 1, wherein determining the exposure settings further comprises:
   determining the lighting conditions indicate a dynamic range for the image scene that is greater than or equal to a second predetermined threshold; and
   determining the exposure settings to include a first exposure duration and a second exposure duration that is longer than the first exposure duration, and a third exposure duration longer than the first exposure duration and the second exposure duration.

8. The method of claim 1, wherein determining the exposure overlap setting further comprises:
   determining that the movement conditions indicate movement in at least one portion of the image scene for which the lighting conditions are less than a predetermined threshold; and
   determining the exposure overlap setting such that a long exposure indicated by the exposure settings overlaps at least partially with another exposure indicated by the exposure settings.

9. The method of claim 1, wherein determining the exposure overlap setting further comprises:
   determining that the movement conditions indicate movement in at least one portion of the image scene for which the lighting conditions are greater than or equal to a predetermined threshold; and
   determining the exposure overlap setting such that a short exposure indicated by the exposure settings overlaps at least partially with another exposure indicated by the exposure settings.

10. The method of claim 1, further comprising: determining, based on the lighting conditions, an operating mode for at least one image sensor including the image sensor, wherein the operating mode is selected from the group consisting of a binning operating mode and a remosaic operating mode.

11. An apparatus, comprising:
   a memory storing processor-readable code; and
   at least one processor coupled to the memory, the at least one processor configured to execute the processor-readable code to cause the at least one processor to perform operations including:
      determining lighting conditions and movement conditions for an image scene;
      determining, based on the lighting conditions, exposure settings for an image sensor, wherein the lighting conditions further includes a brightness measure of the image scene;
      determining, based on the lighting conditions and the movement conditions and the exposure settings, an exposure overlap setting for the image sensor,
      controlling the image sensor to capture at least one first image frame according to the exposure settings and the exposure overlap setting;
      determining an anchor frame of a blending process based on the brightness measure and the movement conditions; and
      determining, based on the at least one first image frame, an output image frame, wherein the output image frame is determined by blending the at least one image frame according to the blending process.

12. The apparatus of claim 11, wherein the exposure settings for the image sensor include exposure durations for the at least one first image frame captured by the image sensor.

13. The apparatus of claim 11, wherein determining the exposure settings further comprises:

determining that the lighting conditions indicate a dynamic range for the image scene that is greater than or equal to a first predetermined threshold; and determining the exposure settings to include a first exposure duration and a second exposure duration that is longer than the first exposure duration.

14. The apparatus of claim 11, wherein determining the exposure settings further comprises:

determining the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

15. The apparatus of claim 12, wherein determining the exposure overlap setting further comprises:

determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

16. The apparatus of claim 11, wherein determining the exposure overlap setting further comprises:

determining that the movement conditions indicate movement in at least one portion of the image scene for which the lighting conditions are greater than or equal to a predetermined threshold; and determining the exposure overlap setting such that a short exposure indicated by the exposure settings overlaps at least partially with another exposure indicated by the exposure settings.

17. The apparatus of claim 11, wherein the operations further comprise determining, based on the lighting conditions, an operating mode for at least one image sensor including the image sensor, wherein the operating mode is selected from the group consisting of a binning operating mode and a remosaic operating mode.

18. A non-transitory computer-readable medium storing instructions that, when executed by a processor, cause the processor to perform operations comprising:

determining lighting conditions and movement conditions for an image scene;

determining, based on the lighting conditions, exposure settings for an image sensor, wherein the lighting conditions further includes a brightness measure of the image scene;

determining, based on the lighting conditions and the movement conditions and the exposure settings, an exposure overlap setting for the image sensor;

controlling the image sensor to capture at least one first image frame according to the exposure settings and the exposure overlap setting;

determining an anchor frame of a blending process based on the brightness measure and the movement conditions; and determining, based on the at least one first image frame, an output image frame, wherein the output image frame is determined by blending the at least one image frame according to the blending process.

19. The non-transitory computer-readable medium of claim 18, wherein determining the exposure settings further comprises:

determining that the lighting conditions indicate a dynamic range for the image scene that is greater than or equal to a first predetermined threshold; and determining the exposure settings to include a first exposure duration and a second exposure duration that is longer than the first exposure duration.

20. The non-transitory computer-readable medium of claim 18, wherein determining the exposure settings further comprises:

determining the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

21. The non-transitory computer-readable medium of claim 18, wherein determining the exposure overlap setting further comprises:

determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

22. The non-transitory computer-readable medium of claim 18, wherein determining the exposure overlap setting further comprises:

determining that the movement conditions indicate movement in at least one portion of the image scene for which the lighting conditions are greater than or equal to a predetermined threshold; and determining the exposure overlap setting such that a short exposure indicated by the exposure settings overlaps at least partially with another exposure indicated by the exposure settings.

23. An image capture device, comprising:

an image sensor;

a memory storing processor-readable code; and at least one processor coupled to the memory and to the image sensor, the at least one processor configured to execute the processor-readable code to cause the at least one processor to:

determine lighting conditions and movement conditions for an image scene, wherein the lighting conditions further includes a brightness measure of the image scene;

determine, based on the lighting conditions, exposure settings for the image sensor;

determine, based on the lighting conditions and the movement conditions and the exposure settings, an exposure overlap setting for the image sensor;

control the image sensor to capture at least one first image frame according to the exposure settings and the exposure overlap setting;

determine an anchor frame of a blending process based on the brightness measure and the movement conditions; and determine, based on the at least one first image frame, an output image frame, wherein the output image frame is determined by blending the at least one image frame according to the blending process.

24. The image capture device of claim 23, wherein determining the exposure settings further comprises:

determining that the lighting conditions indicate a dynamic range for the image scene that is greater than or equal to a first predetermined threshold; and determining the exposure settings to include a first exposure duration and a second exposure duration that is longer than the first exposure duration.

25. The image capture device of claim 23, wherein determining the exposure settings further comprises:

determining the lighting conditions indicate a dynamic range for the image scene that is greater than or equal to a second predetermined threshold; and determining the exposure settings to include a first exposure duration and a second exposure duration that is longer than the first exposure duration, and a third exposure duration longer than the first exposure duration and the second exposure duration.

26. The image capture device of claim 23, wherein determining the exposure overlap setting further comprises:

determining that the movement conditions indicate movement in at least one portion of the image scene for which the lighting conditions are less than a predetermined threshold; and determining the exposure overlap setting such that a long exposure indicated by the exposure settings overlaps at least partially with another exposure indicated by the exposure settings.

27. The image capture device of claim 23, wherein determining the exposure overlap setting further comprises:

determining that the movement conditions indicate movement in at least one portion of the image scene for which the lighting conditions are greater than or equal to a predetermined threshold; and determining the exposure overlap setting such that a short exposure indicated by the exposure settings overlaps at least partially with another exposure indicated by the exposure settings.

* * * * *